Sept. 26, 1944. H. E. SOMES 2,359,167
WORK HANDLING APPARATUS
Filed April 13, 1942 9 Sheets-Sheet 1
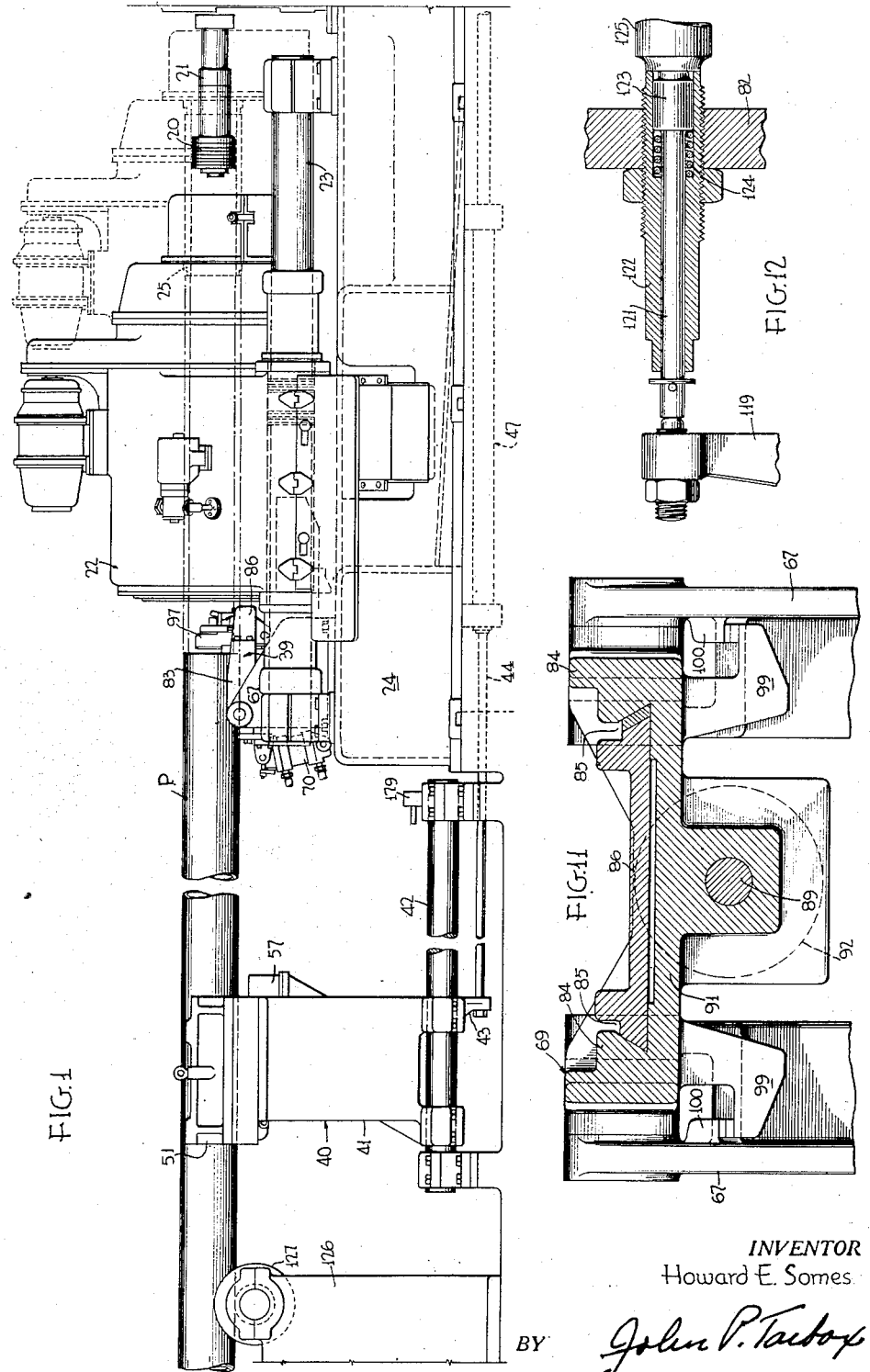
INVENTOR
Howard E. Somes
BY John P. Tarbox
ATTORNEY

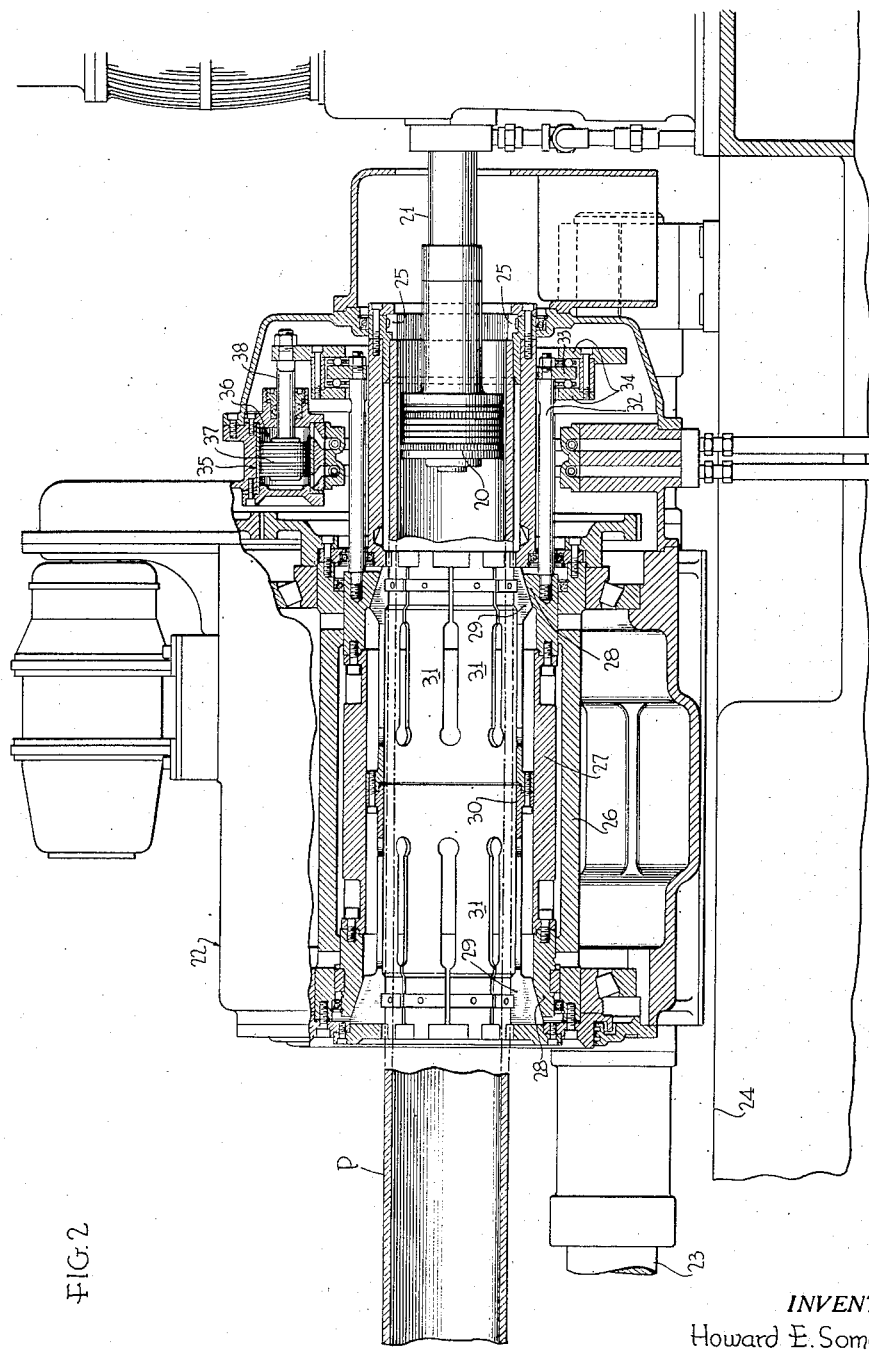

Sept. 26, 1944.                H. E. SOMES                    2,359,167
                          WORK HANDLING APPARATUS
                          Filed April 13, 1942          9 Sheets-Sheet 3
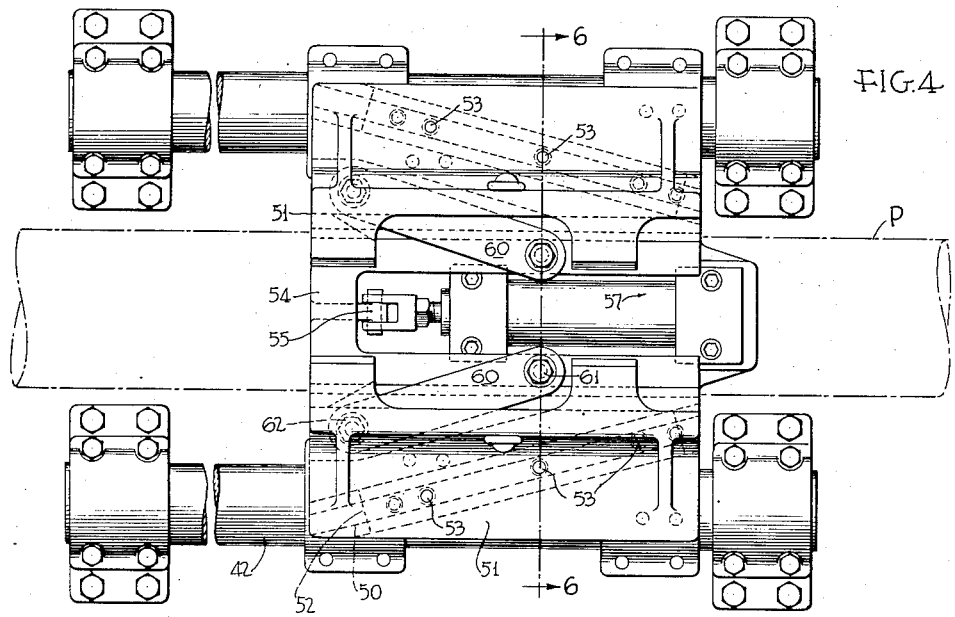
FIG.4
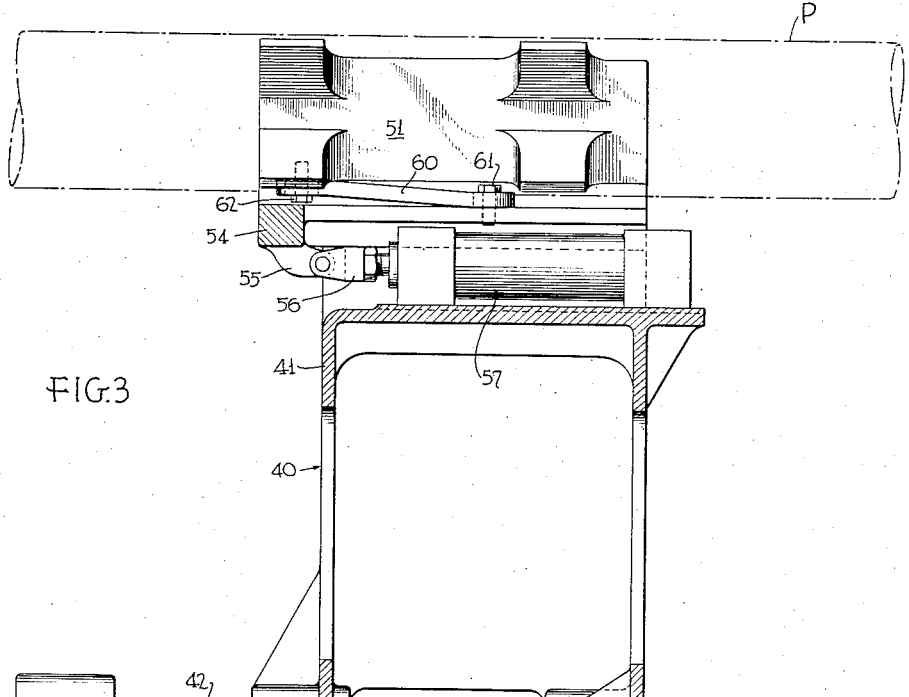
FIG.3
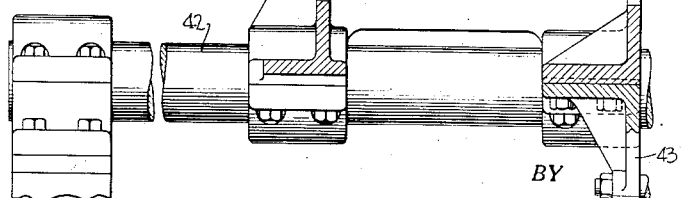
INVENTOR
Howard E. Somes
BY
John P. Tarbox
ATTORNEY INVENTOR
Howard E. Somes
BY John P. Tarbox
ATTORNEY

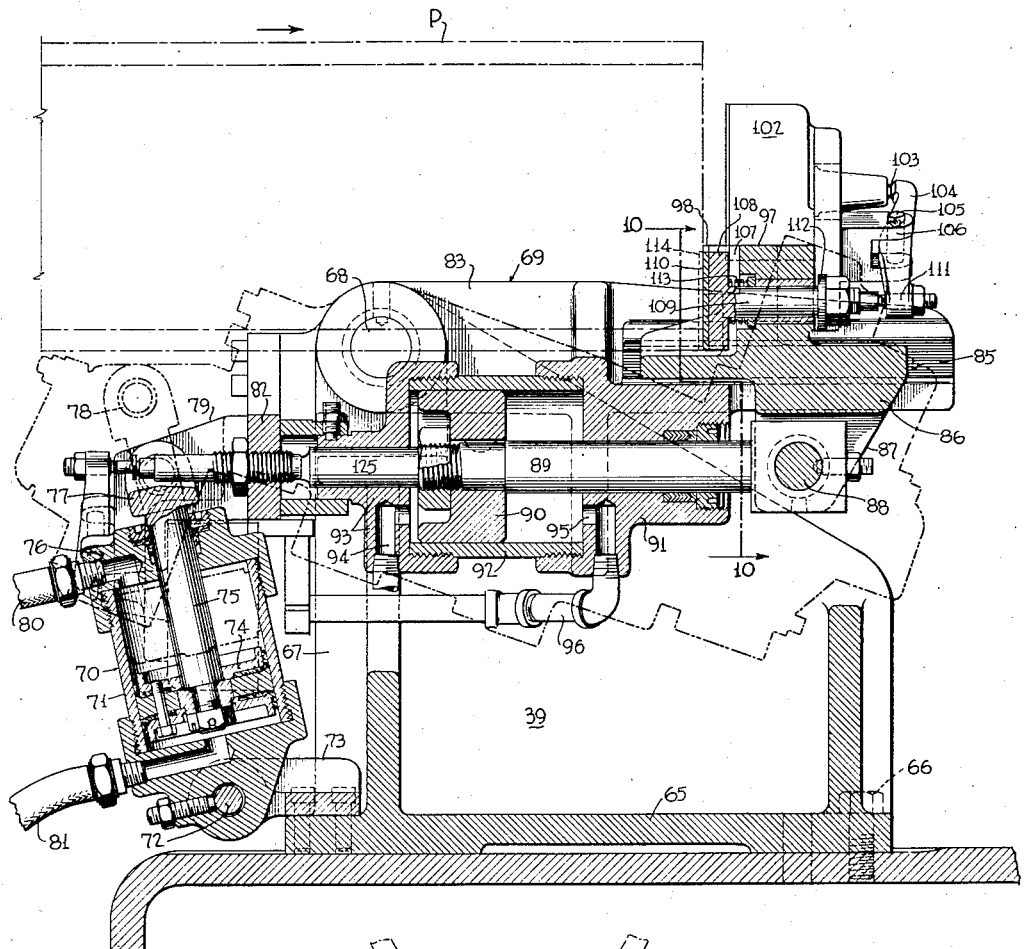

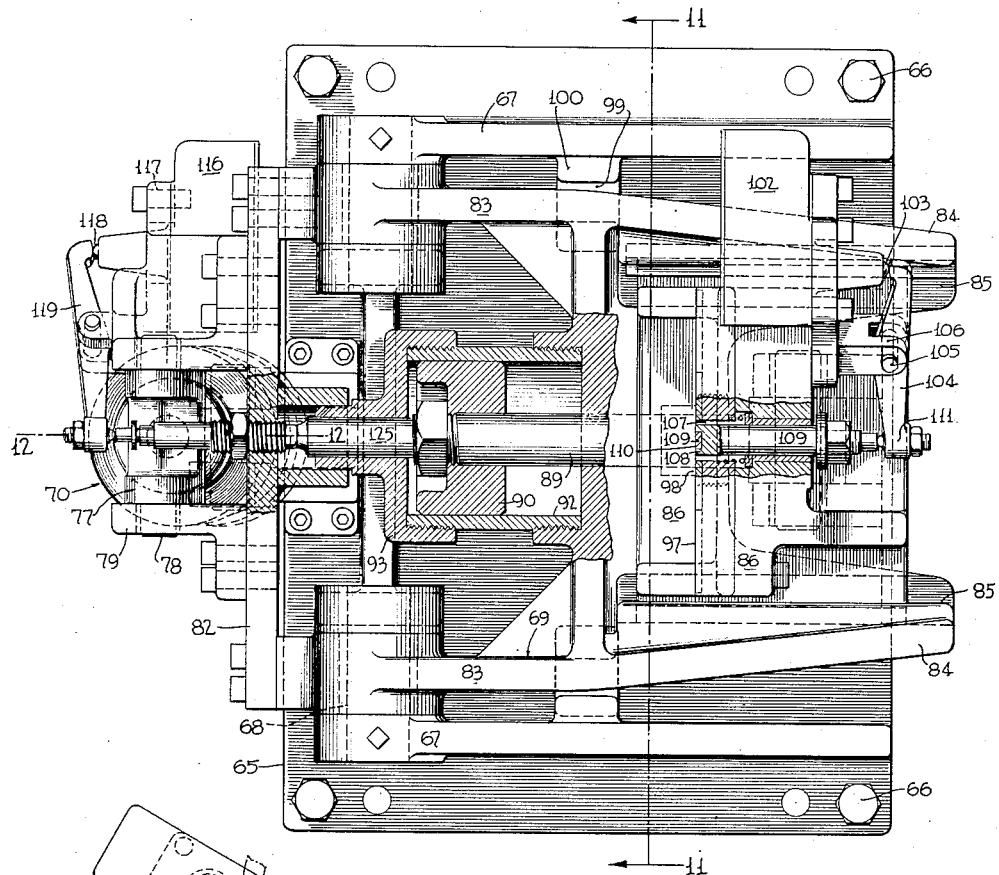

Sept. 26, 1944.  H. E. SOMES  2,359,167
WORK HANDLING APPARATUS
Filed April 13, 1942  9 Sheets-Sheet 8

INVENTOR
Howard E. Somes
BY John P. Tarbox
ATTORNEY

Patented Sept. 26, 1944

2,359,167

UNITED STATES PATENT OFFICE 2,359,167

WORK HANDLING APPARATUS

Howard E. Somes, Detroit, Mich., assignor to Budd Induction Heating, Inc., Philadelphia, Pa., a corporation of Michigan Application April 13, 1942, Serial No. 438,738

20 Claims. (Cl. 214—1)

This invention relates to heat treating apparatus, and more particularly to new and improved loading and unloading mechanism therefor.

In my copending application, Serial No. 415,480, filed October 18, 1941, I have shown and described a heat treating apparatus for heat treating the ends of relatively long pipe such as used in the oil and gas industry. Such tubes are of relatively great length and weight and difficult to handle. Extreme care must be used in properly loading and locating pipes and tubes of this character in the heat treating machine so as not to injure the various parts of the same.

The primary object of the present invention is to provide a heat treating machine or other apparatus with an improved loading mechanism which will mechanically and accurately position relatively long and heavy articles in a chucking device of such heat treating machine or other apparatus.

Another object is to provide an apparatus having an article-holding and chucking device with a loading mechanism which is operative at a predetermined period in a cycle of operation of the apparatus to mechanically load and unload the chucking device and is inoperative during the remainder of the cycle of operation.

Another object is to provide an apparatus having an automatically operating chucking device and a loading and unloading mechanism provided with an article clamping means which are so coordinated in their operation that during a loading operation the article will not be released by the clamping means until the chucking device has securely engaged the article and that during an unloading operation the chucking device will not release the article until after it has been securely clamped by the clamping means.

Another object is to provide a heat treating apparatus with an article loading and unloading mechanism which is so coordinated with the heat treating operation that the heat treating operation cannot be started unless the loading mechanism after unloading the article is in a predetermined relative position with respect to the heat treating apparatus.

Another object is to provide a heat treating machine having an automatically operating loading and unloading mechanism with improved control apparatus for predetermining the operation of the various parts of the same.

A further object is to provide an article loading and unloading mechanism for a heat treating machine with an improved automatic control mechanism which is under the control of the controlling mechanism of the heat treating machine.

With the above and other objects in view, which will be apparent from the following description to those skilled in the art, the present invention consists in certain features of construction and combinations of parts to be hereinafter described with reference to the accompanying drawings and then claimed.

In the drawings which illustrate a suitable embodiment of the invention:

Figure 1 is a side elevation of a heat treating apparatus showing the loading and unloading mechanism of the present invention incorporated therewith;

Figure 2 is a fragmentary longitudinal section of the chucking device of the heat treating machine;

Figure 3 is an enlarged side elevation of the feeding device of Figure 1, having a portion of the same broken away and shown in vertical section;

Figure 4 is an enlarged plan view of the feeding device, more clearly showing the article clamps thereof;

Figure 7 is an enlarged longitudinal sectional view of the cushioning stop mechanism shown in Figure 1;

Figure 8 is a rear end elevation of the cushioning stop mechanism of Figure 7;

Figure 9 is a top plan view of the cushioning stop mechanism, a portion of the same being shown in section;

Figure 10 is a transverse section taken on line 10—10 of Figure 7;

Figure 11 is a transverse section taken on line 11—11 of Figure 9;

Figure 12 is a longitudinal section of one of the switch operating shafts of the cushioning stop mechanism, taken on line 12—12 of Figure 9;

Figure 16:
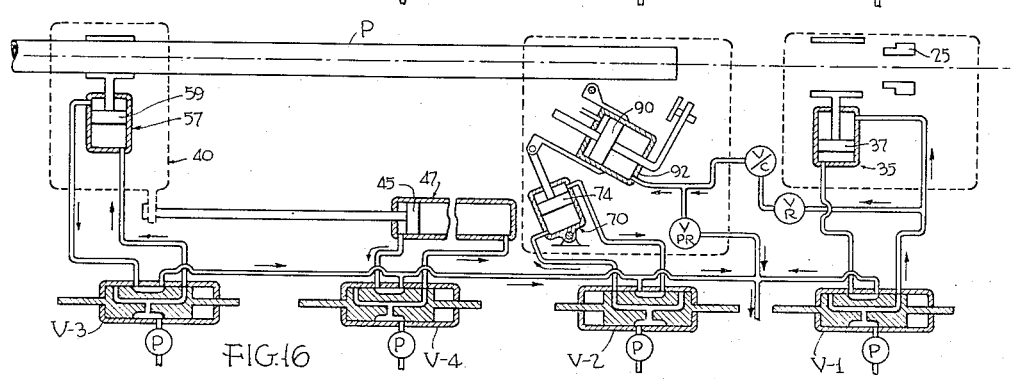
Figure 17:
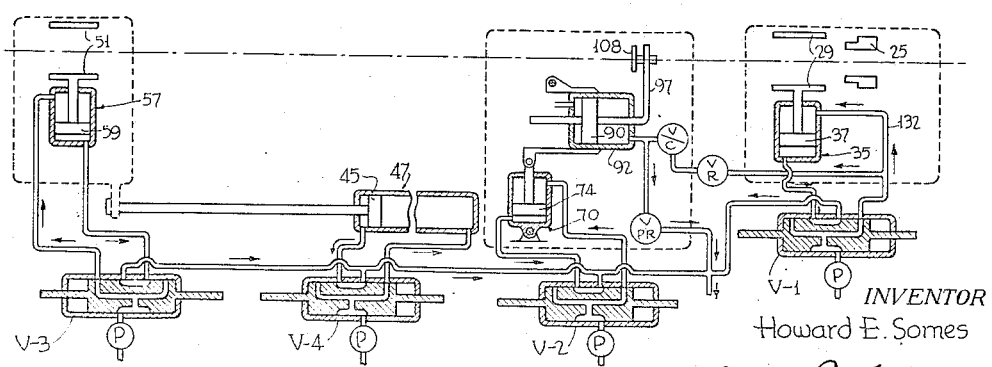
Figure 18:
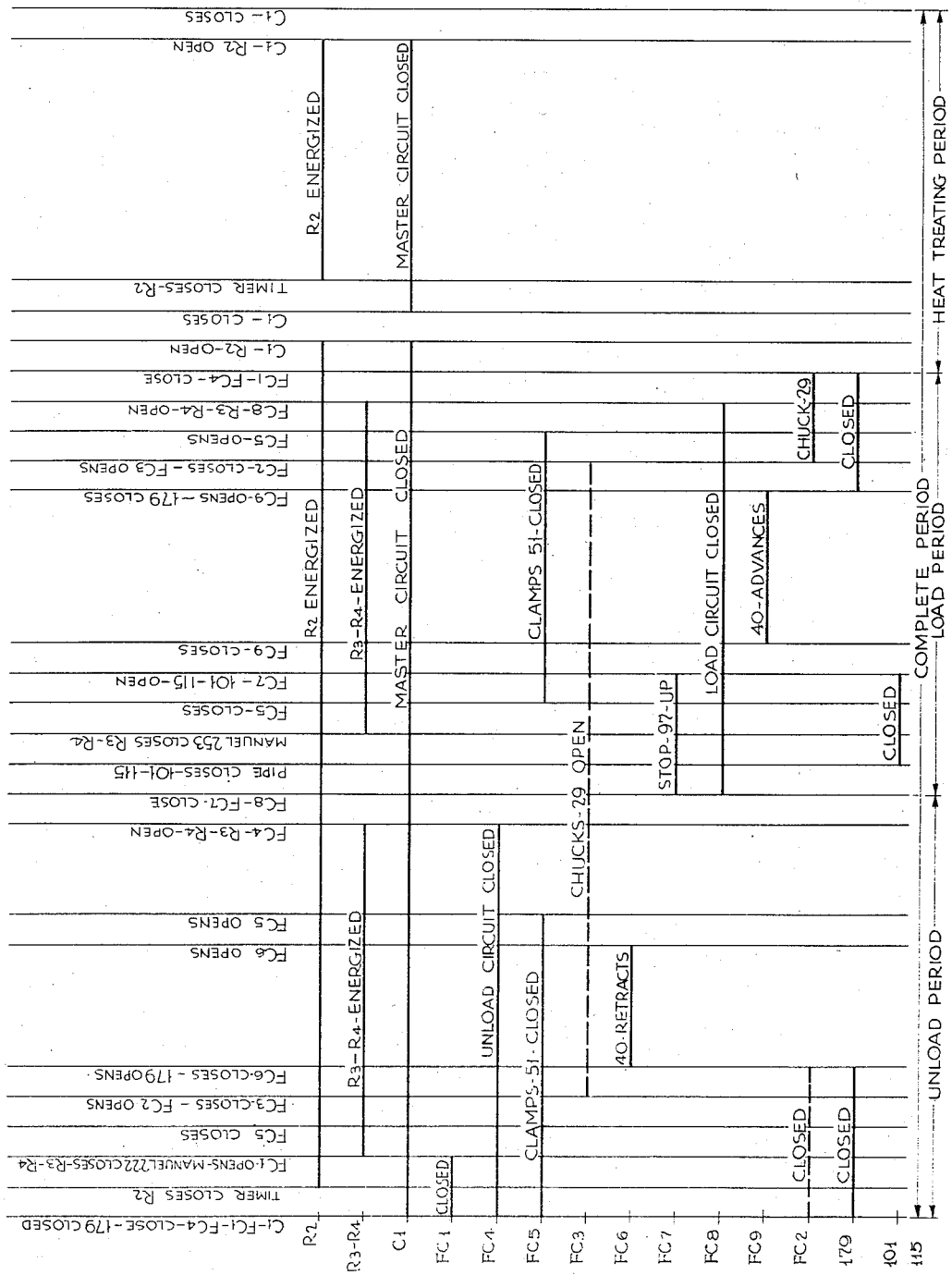

Figures 14 to 17 inclusive are diagrammatic views showing various sequences of operation of the hydraulic controls, and Figure 18 is a diagram showing the sequence of operation of the various control elements.

Referring to the accompanying drawings in which like numerals refer to like parts throughout the several views, the apparatus of the present invention is adapted to feed and properly position relatively long pipes with respect to the feed chuck or carriage of a heat treating machine of the character shown and described in my copending application aforesaid, the purpose of which is to internally harden the end of a steel pipe such as, for example, pipes used as oil well casing and tubing and as gas and oil lines. Such pipe ends are hardened to increase the strength of the threaded joints.

Portions of the heat treating apparatus of the copending application aforesaid are shown in Figures 1 and 2 and embody a horizontally positioned, induction heating head 20 supported by a horizontal arbor 21. The steel pipe P to be heat treated is progressively moved axially of the head 20 by means of a chucking device 22 which is horizontally reciprocated on side rods 23 carried by a machine base 24. The chucking device is shown in Figure 1 as being in its retracted position and in Figure 2 in its advanced position wherein the pipe P surrounds the heating head 20.

The chucking device 22 carries at its forward end, as shown in Figure 2, an annular radially laminated element 25 of magnetic material against which the leading end of the pipe P abuts, the element 25 constituting a magnetic circuit extension of the steel pipe which functions to minimize end effects and to permit uniform heating at the pipe end, as set forth in my patent, Number 2,208,607, dated July 23, 1940.

It is obvious that in order to maintain concentricity between the pipe P to be heat treated and the heating head 20, and in order to insure close contact between the end of the pipe P and extension 25, the pipe must be securely and accurately clamped in position. To this end, the chucking device 22 is provided with an annular coaxial cylinder 26 within which a multipart sleeve 27 is arranged for axial sliding movement. The ends of this sleeve are tapered in the same direction to form clamping wedges 28 for cooperation with complementary cam surfaces 29 arranged at the opposite ends of an axially fixed inner sleeve 30 which is longitudinally slotted at a plurality of points at its ends to provide longitudinally extending fingers 31 which carry the cam surfaces 29. The sleeve 27 is axially reciprocated by means of longitudinal rod members 32 secured to an annular ring 33 which is mounted between annular end thrust rings 34. These end thrust rings 34 are axially reciprocated by means of one or more fluid motors 35, each comprising a fluid pressure cylinder 36 and a piston 37 reciprocably mounted in the cylinder 36 and having its piston rod 38 connected with the thrust rings 34.

By admitting fluid under pressure to the cylinders 36 of the fluid motors 35, the pistons 37 through piston rods 38, end thrust rings 34 and rods 32 axially slide the sleeve 27. Movement of the sleeve 27 to the left, as viewed in Figure 2, causes the fingers 31 through the medium of the cooperating wedges 28 and cam portions 29 to flex radially inward and securely engage the circumferential surface of the pipe P and hold it in clamped position. Movement of the sleeve 27 to the right releases the clamping pressure on the fingers 31 whereby the fingers 31 will spring back out of clamping engagement with the pipe P.

The structural details of the chucking device 22 are more fully described in my copending application aforesaid.

The pipes to be heat treated are relatively heavy and since as previously explained they must have proper engagement with the end extension element 25, extreme care must be employed in feeding the pipe to be heat treated into the chucking device in order to properly position the same and to prevent injury to the end extension element 25 through undue impact.

The present invention contemplates a relatively simple and most efficient and accurate means for feeding the pipe to the chucking device 22.

Broadly, the apparatus embodies a cushioning stop mechanism 39 which is movable into and out of engagement with the leading end of the pipe P which stop mechanism predetermines a first forward feeding movement of the pipe P, a pipe clamping device 40 which is arranged to first securely clamp the pipe when it reaches this predetermined forward position, and then axially move the pipe forwardly into the chucking device 22 the proper and exact distance for engagement with the end extension element 22, and certain control apparatus to be hereinafter described for effecting the desired operation.

The clamping device 40 includes a base or carriage 41 mounted to horizontally slide upon a pair of spaced parallel guide rods 42 secured to the machine foundation. The carriage 41 is provided with a depending bracket 43 which is connected through rod 44 with a piston 45 (Figure 13) reciprocably contained within the cylinder 46 of a fluid pressure motor 47 in such manner that the admission of fluid to the cylinder 46 will cause piston 45 through rod 44 to move the clamping device 40 toward and away from the chucking device 22.

Referring to Figures 3, 4, 5 and 6, the base 41 is provided with a pair of horizontal clamp supports 48 arranged in parallel spaced relation which are provided at their inner faces with guide ways 49 and in their upper faces with inverted T-slots 50 which, as will be seen in the plan view of Figure 4, converge from the left, as illustrated in this view. Positioned upon the supports 48 are opposed V-clamps 51 which face each other, each of which has an inverted T-shaped guide 52 secured to the bottom surfaces thereof by suitable cap screws 53. The guides 52 are complementary to the slots 50 and are interfitted therewith for sliding movement. Arranged to slide within the side slots 49 is a yoke 54 having a depending bracket 55 which is connected with the piston rod 56 of a reciprocable fluid pressure motor 57 having a cylinder 58 and a reciprocable piston 59 therein (Figure 13) fixed to the piston rod 56. The legs of the yoke 54 are each provided with a link 60 pivoted at one end thereto by means of pin 61. The opposite ends of these links 60 are pivoted to overhanging portions of the V-clamps 51 by suitable pivot pins 62. It thus will be seen that actuation of the rod 56 by admission of fluid under pressure to the cylinder 58 of the fluid pressure motor 57 will cause the yoke 54 through the pivoted links 60 to simultaneously slide the V-blocks or clamps 51, the divergent guides 52 and slots 50 causing the V-blocks 51 to also move laterally toward each other to clamp the pipe P, shown in broken outline in these views, or to separate from clamping relation with the pipe, depending, of course, upon the direction of sliding movement of the yoke 54.

The cushioning stop mechanism 39, shown in detail in Figures 7 to 12 inclusive, is mounted on the machine base 24 so as to be positioned between the chucking device 22 and the clamping device 40. It includes an upright U-shaped support 65 secured to the upper side of the machine base 24 by cap screws 66. Pivotally mounted to the upper ends of the legs 67 by axially aligned pins 68 is a generally H-shaped frame 69 arranged to swing from the position shown in broken outline in Figure 7 to the position shown in solid outline. In order to effect this swinging movement, a fluid pressure motor 70 is employed. The motor 70 comprises a cylinder 71 pivoted at its closed end by a pin 72 to a bracket 73 suitably secured to the support 65, and a piston 74 reciprocably mounted within the cylinder 71 and having its piston rod 75 extending through the removable upper end 76 of cylinder 71 and pivotally secured by means of the yoke 77 and pivot pins 78 to rearwardly extending extensions 79 of the H-frame 69 whereby the admission of fluid under pressure through one or the other of conduits 80 and 81 into the cylinder at one side of piston 74 will swing the H-frame 69 upwardly or downwardly, depending, of course, upon which side of the piston the fluid under pressure is admitted.

As shown in the plan view of Figure 9, the rearward extensions 79 are carried by a bar 82 suitably secured to the pivoted rearward legs 83 of the H-frame 69.

The forward legs 84 of the H-frame 69 are provided with opposed parallel angle guide ways 85 to slidably receive a stop slide 86. This slide is provided with a depending bracket 87 which is connected through pin 88 with a rearwardly extending rod 89 which carries a piston member 90. The bar 91 of the H-frame is recessed for the rod 89 to extend therethrough and carries a cylinder 92 in surrounding cooperation with the piston member 90. The rearward end of the cylinder is closed by a cap 93 having an exhaust recess 94 therein opening to the rearward side of the piston member 90. The bar 91 of the H-frame is also provided with an aperture 95 opening to the forward side of the piston member 90, a fluid conduit 96 being connected to this aperture.

The slide 86 is provided with an upstanding block 97 having hardened wear plates 98 secured to its rearward face against which the pipe P abuts when it is moved to its first advance position.

In operation, with the H-frame 69 in its upper position which is predetermined by fingers 99 adapted to engage laterally extending lugs 100 integrally formed on the support legs 67, fluid under pressure is admitted, as will be more fully described later, to move the piston member 90 and, consequently, the slide 86 to the left as viewed in Figure 7 so that as pipe P is moved forwardly and engages the wear plates 98 of the upstanding member 97 farther forward movement of the pipe is cushioned by the fluid within the cylinder 92 at the right of the piston whereby the pipe will come to a gradual cushioned stop with the piston member 90 engaging the end of the cylinder 92 to predetermine the maximum forward position of the pipe.

Associated with the slide 86 is a normally open limit switch 101 (Figure 13), not shown in Figures 7 and 9, arranged within a housing 102 secured to the slide 86 and arranged to be operated by a sliding pin 103 from one end of a lever 104 pivoted intermediate its ends by pin 105 to a bracket 106 secured to the slide 86. The upstanding portion 97 is formed with a recess 107 intermediate its ends within which a plunger 108 is located and has its shank 109 axially slidably mounted in the upstanding portion 97. The face of the plunger 108 is also provided with a hardened wear plate 110. The plunger shank 109 extends through the portion 97 into end engagement with the end 111 of the lever 104 and is provided with a stop 112 to limit its movement to the left slightly in advance of the wear plates 98, as shown by the broken outline position 114 of the plunger 108, so that in approaching the wear stop plates 98 the pipe P must first engage the plunger 108 and move it to switch closing position before engaging the wear plates 98.

A second normally open limit switch 115 (Figure 13) is arranged within a housing 116 which is secured to a bracket 117 carried by the cross piece 82 (Figure 9) and having an actuating slide pin 118 arranged to be actuated by one end of a lever 119 which is pivoted by pin 120 to the bracket 117. The other end of the lever 119 engages a slidable shaft 121 (Figure 12) slidably arranged within a sleeve 122 carried by the cross piece 82 and having a head portion 123. A coiled compression spring 124 engaged with the head 123 and sleeve 122 urges the shaft 121 into the following engagement with a rearward extension 125 of the piston rod 89, as shown in Figure 9. During cushioning movement of the rod 89 the spring 124 causes the shaft 121 to move to the right, as viewed in Figure 9, to permit the switch 115 to close. The two limit switches 101 and 115 are thus closed when the slide 86 is moved to its final cushioning position and are opened by retracting movement of the slide 86 from this final position for a purpose which will be apparent from the subsequent description of the control circuit of Figure 13.

In Figure 1, there is shown a support 126 having a roller 127 for supporting the pipe P for its feeding movement. It is to be understood that any desired number of rollers or other suitable means may be employed for supporting the pipe P.

Figure 5:
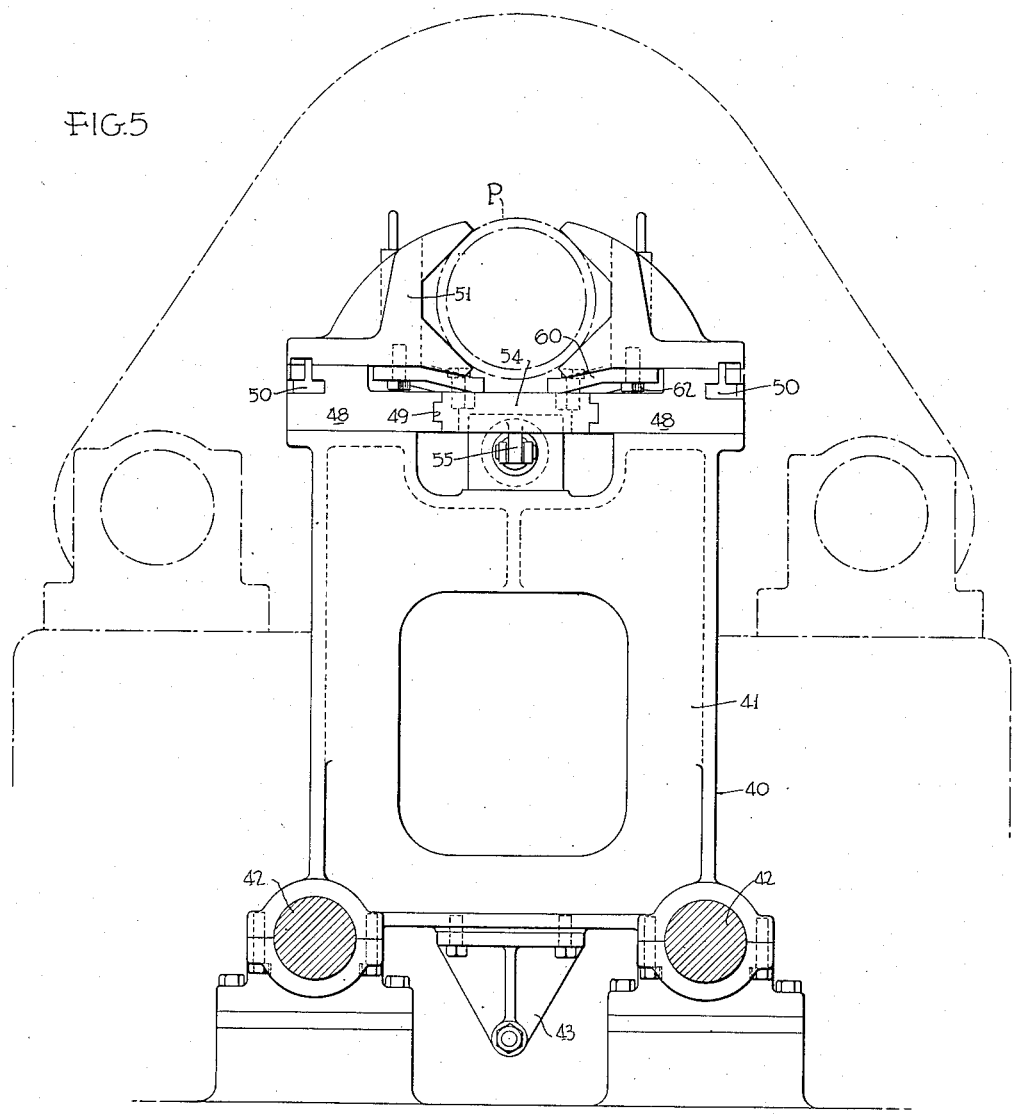
Figure 5 is a trailing end elevation of the feeding device.
Figure 6:
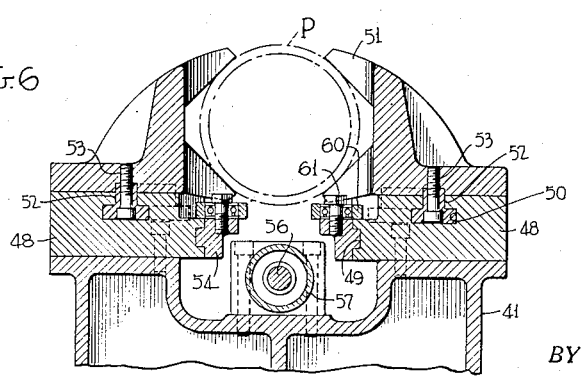
Figure 6 is a transverse section taken on line 6—6 of Figure 4.
Figure 13:
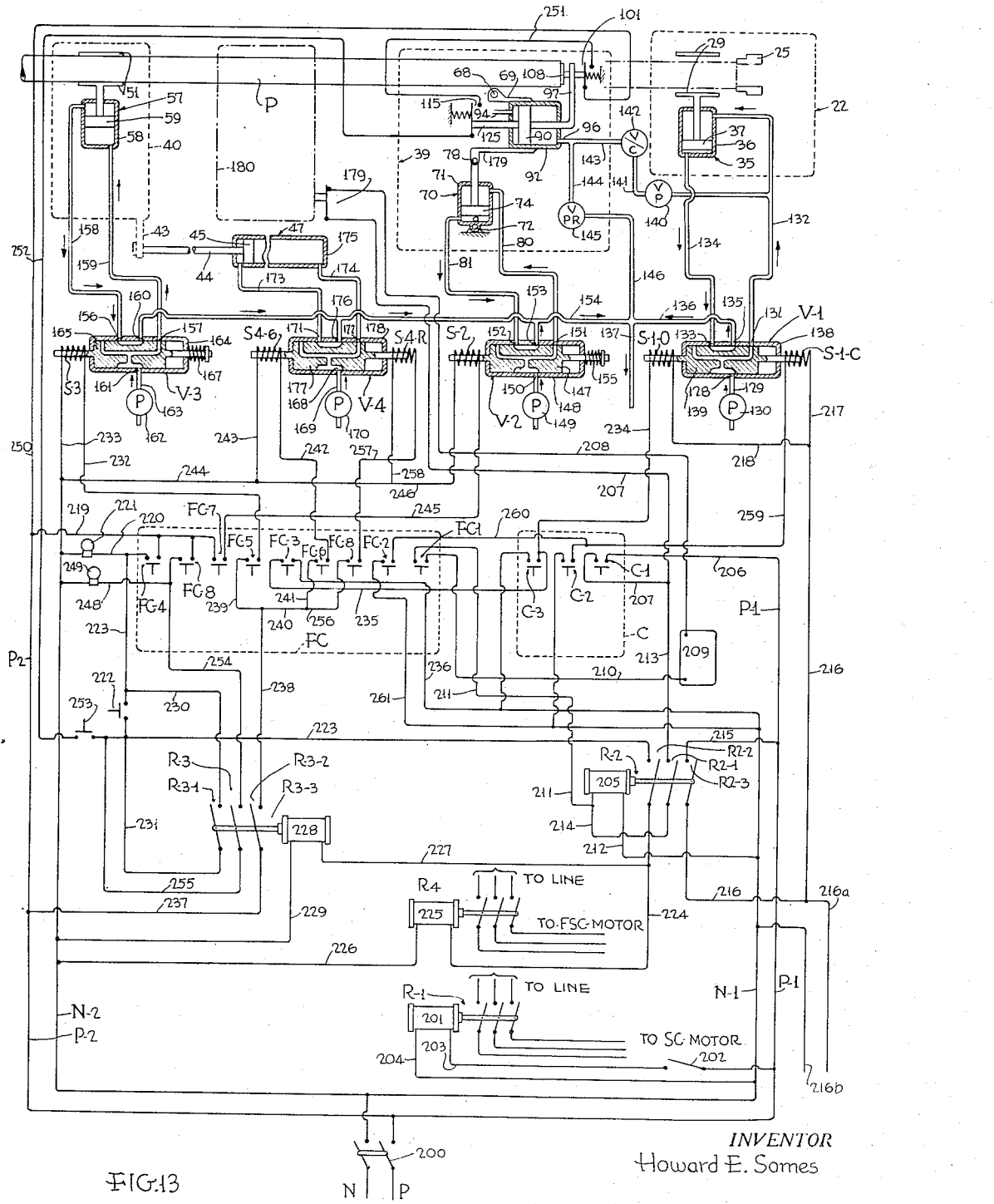
Figure 13 is a diagrammatic view of the control apparatus in association with a wiring diagram of the electrical circuits therefor.
Figure 14:
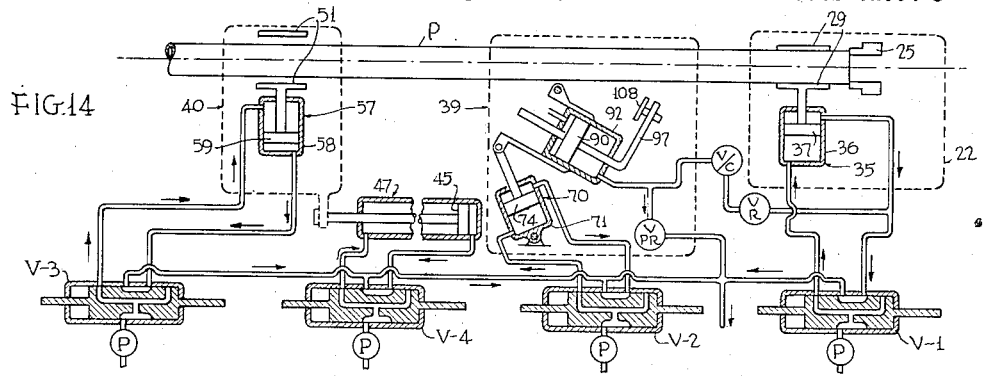

In Figure 13 and in Figures 14 to 17 inclusive, I have shown the hydraulic control circuit for the various mechanisms which are diagrammatically illustrated in these views. First, considering the control for the fluid pressure motor 35 of the chucking device 22 of the heat treating machine, a suitable electrically operated control valve V-1 is provided. As illustrated, this valve is provided with an inlet 128 connected by conduit 129 with a pump 130 which in turn is connected with a suitable source (not shown) of fluid, a port 131 connected by conduit 132 with the motor cylinder 36 at one side of piston 37, a port 133 connected by conduit 134 with motor cylinder 36 at the other side of piston 37, and a return port 135 connected by conduit 136 with a return port pipe 137 to return fluid to the liquid source. These ports are arranged in a casing 138 having a ported movable valve member 139 which is arranged to be operated by a pair of solenoids S-1-C and S-1-O and, preferably is of the type which centers itself when the two solenoids are deenergized, i. e. the normal valve position is one in which the valve member 139 is in such position as to close both ports 131 and 132. Energization of solenoid S-1-O moves valve member 139 to the left as viewed in Figure 13 whereby fluid flows under pressure through conduit 132, as indicated by the arrows to cause the piston 37 to move the clamps 29 to open position, the fluid at the other side of piston 37 flowing under little or no pressure through conduit 134, ports 133 and 135, and conduit 136 to the return pipe 137. Energization of solenoid S-1-C moves the valve member 139 to the right whereby to connect the inlet port 128 with port 133 to conduct fluid through conduit 134 to cause piston 37 to close the clamps 29, the fluid at the other side of piston 37 then flowing through conduit 132, ports 131 and 135 and conduit 136 to the return pipe 137. This latter condition is shown in Figure 14.

Fluid under pressure is also conducted from conduit 132 through a pressure reducing valve 140, conduit 141 and a check valve 142 through conduit 143 to the conduit 96 for the cushioning cylinder 92 to urge the piston 90 of cylinder 92 to the left, as viewed in Figure 13. The conduit 96 is connected by conduit 144 with a pressure regulating valve 145 which exhausts through conduit 146 to the return conduit 137. It is thus seen that when the main chuck clamps 29 are held open by fluid flow through conduit 132 this fluid also branches off to the cylinder 92 for cushioning the piston 90. The cushioning pressure, of course, can be adjusted to any desired amount by adjusting the regulating valve 145 to open at a desired pressure.

Figure 15:
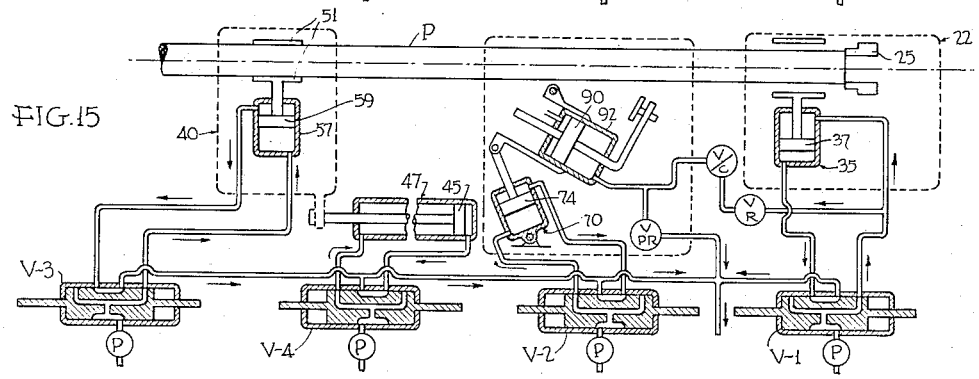

The cushioning cylinder 92 is swung from the operative upper position indicated in Figure 13 to its lowered position and vice versa by the motor 70 which is under the control of an electrically operated valve V-2 which is similar to valve V-1 with the exception tht it is actuated by a single solenoid S-2. Solenoid S-2 when energized, moves the valve member 147 of the valve casing 148 to the left, as viewed in Figure 13, against the resistance of a compression spring 155. In this valve position, fluid flows from pump 149 under pressure through inlet port 150 and thence through port 151 and conduit 80 into the cylinder 71 of motor 70 above the piston 74 thereof to elevate the cushioning cylinder 92, as shown in Figure 13, the fluid at the opposite side of piston 74 flowing through conduit 81, ports 152 and 153 and back through conduit 154 to the fluid return line 137. Upon deenergization of the solenoid S-2 the spring 155 moves valve member 147 to the right to connect inlet port 150 with port 152 and to connect exhaust port 153 with port 151 whereby to reverse the fluid flow through conduits 80 and 81 and cause piston 74 to swing cylinder 92 to its lowered position. This valve position is shown in Figure 15.

The valve V-3 for controlling the fluid motor 57 which actuates clamps 51 of the feed device 40 is identical with valve V-2, the casing 164 therefor being provided with ports 156 and 157 which are respectively connected through conduits 158 and 159 respectively with the cylinder 58 of motor 57 at opposite sides of the piston 59 thereof, and is also provided with an exhaust port 160 connected through conduit 154 with the return line 137, and an inlet port 161 which receives fluid from pump 162 through conduit 163. The ported valve member 165 is actuated by a solenoid S-3 to the left against the resistance of a compression spring 167 to connect ports 161 and 157 for the supply of fluid through conduit 159 to cause the piston 59 to close the clamps 51 about the pipe P to be fed to the heat treating machine chuck 22. The spring 167 upon deenergization of solenoid S-3 moves the valve member 165 to the left to place port 161 in communication with port 156 and ports 157 and 160 in communication with each other whereby to reverse the fluid flow thru conduits 158 and 159 and thereby open the clamps 51. This latter position is shown in Figure 14.

The fluid pressure motor 47, which reciprocates the feed device 40, is under the control of a valve V-4 of the same construction as the valve V-1. The casing 178 of this valve has an inlet port 168 connected by conduit 169 with a supply pump 170, ports 171 and 172 connected thru conduits 173 and 174 respectively with the ends of the cylinder 175 of motor 47 at opposite sides of piston 45, and an exhaust port 176 connected with the return conduit 154. The valve member 177 is actuated by solenoids S-4-L and S-4-R. Solenoid S-4-L when energized moves valve member 177 from a neutral or intermediate position to the left whereby fluid under pressure flows from the inlet 168 through port 172 and conduit 174 to cause the piston of motor 47 to move the clamping device 40 to the left, as viewed in Figure 13. Upon deenergization of solenoid S-4-L, valve member 177 moves to its intermediate position, closing ports 171 and 172, and upon energization of solenoid S-4-R, valve member 177 moves to the right to place port 171 in communication with inlet port 168 and port 172 in communication with the exhaust port 176 to reverse the flow thru conduits 173 and 174 and cause the piston 45 to move the clamping device 40 to the right. This latter condition is shown in Figures 14 and 15. This position of the feeding device 40 also is the position shown in Figure 1.

A switch 179, to be later described, is also associated with the feeding device 40 to be actuated to closed position when the base 41 thereof is moved to its extreme right position, as viewed in Figures 1 and 13, and as indicated by the dot-and-dash outline 180 of Figure 13.

Figure 14 illustrates the condition of the apparatus at a time when a heat treated pipe P has been heat treated and the main chuck 22 has been moved back to its normal retracted unloading and loading position and the chucks or clamps 29 are clamped about the pipe P. In this position, the feeding device is in its advanced position and the clamps 51 thereof are open. Also the cushioning device 39 is lowered. The valves V-1, V-2, V-3 and V-4 are in their proper positions for this condition. The first step in the unloading operation is indicated in Figure 15. Here, valve V-3 has first been actuated to the left to cause the V-clamps 51 to clamp about the pipe P after which valve V-1 then moved to the left to cause clamps 29 of the main chucking device 22 to open. Thus the apparatus is in condition to withdraw the pipe P from the chucking device 22.

Figure 16 illustrates the step wherein the pipe has been withdrawn from device 22, the only change from the conditions existing in the preceding view being that the valve V-4 has shifted to the left to cause the fluid motor 47 to move the feeding device to retracted position.

In Figure 17, valve V-3 has moved back to the right to cause motor 57 to open the feeding clamps 51 and the pipe has been removed. During the removal of the pipe P, valve V-2 has been actuated to the left to cause motor 70 to raise the cylinder 92 to position the cushioning stop 97 in the path of the pipe feeding movement. As seen in this view, the fluid flowing through conduit 132 also flows thru the regulating valve 140, conduit 141, check valve 142 and conduit 143 to the cylinder 92 to urge the piston 90 to the left. The apparatus is then in condition to be reloaded.

During reloading, the pipe is advanced into end engagement with the cushioning stop 97 which cushions its advance to a predetermined advance position which is determined by engagement of piston 90 with the end of the cylinder 92. Upon the pipe reaching this predetermined advance position, valve V-3 is actuated to close clamps 51 after which valve V-2 is actuated to lower the cushioning device 39 out of the path of feeding movement of the pipe. This is followed by the actuation of valve V-4 which effects the advance movement of the feeding device 40 to advance the pipe P the exact distance necessary to position it within the chucking device 22 in proper end engagement with the annular magnetic extension element 25. Valve V-1 is then actuated to cause the main chuck clamps 29 to clamp about the pipe. This is followed by actuation of valve V-3 to open the feed clamps 51. The pipe, thus clamped in the chucking device 22, is ready to be fed by the chucking device 22 for the heat treating operation. This is the position shown in Figure 14. The feed device 40 remains in its advanced position of Figure 14 during the entire heat treating operation and until the chucking device has moved back to the retracted unloading and loading position of Figure 14.

In order to carry out these operations, I provide a series of electrical devices under the control of the circuits shown in Figure 13, and in order to insure proper coordination of the various elements for loading and unloading the chucking device 22, those circuits which control these elements are tied in with the control of the heat treating apparatus in such manner that certain conditions must exist before any operation of the loading and unloading mechanism can be effected.

Since the operation of the heat treating machine is not involved in its entirety with the operation of the loading and unloading apparatus, I have shown only those control circuits which are necessary for a clear understanding of the operation of the loading and unloading mechanism.

These control circuits are associated with a pair of sequence controllers, one of which, indicated at C, is for the heat treating machine and the other of which, indicated at FC, is for the loading and unloading mechanism. These controllers may be of any suitable construction such as drum controllers of well known construction having cams (not shown) for sequentially opening and closing a series of switches, the switches for sequence controller C being indicated C1, C2 and C3, and the switches for the sequence controller FC being indicated as FC1 to FC9 incl., it being understood that various other switches (not shown) are operable by controller C for sequentially operating the various circuits of the heat treating machine which are not involved in the present invention.

Electric current is derived from a suitable source (not shown) through positive and negative feed lines P and N under the control of a main manual switch 200 and thence through sub-lines P1 and N1 for the heat treating machine and sub-lines P2 and N2 for the loading and unloading mechanism.

The starting and stopping of the motor (not shown) for the sequence controller C is controlled by a relay switch R1, the coil 201 of which is energized upon closure of a manual switch 202 in line 203 from P1 through the coil 201 and line 204 to N1. The sequence controller C continuously operates as long as switch 202 is closed.

The sequence controller FC for the loading and unloading mechanism is of the intermittently operating type and has an unloading cycle of 180° rotation and a loading cycle of 180° rotation, considering of course that it is of the rotating drum type.

The circuits under the control of sequence controller C include a master relay R2 which has its operating coil 205 in a circuit from P1 through line 206, sequence controller switch C1, line 207, limit switch 179 which is closed when the feed device 40 is in its advanced position, as heretofore described, line 208, an automatic timer or starter 209, line 210, switch FC1 of the sequence controller FC, line 211 through coil 205 and thence through line 212 to N1. Thus, at the beginning of the cycle of operation of sequence controller C with switches C1, FC1 and 179 closed, the operation of the automatic timer or starter 209 to close this circuit energized coil 205 to close relay R2, which closure closes contacts R2-1, R2-2 and R2-3 thereof. The closure of contacts R2-1 establishes a holding circuit P1, line 206, sequence controller switch C1, line 207, line 213 through relay contacts R2-1, line 214, coil 205 and through line 212 to N1, thus shunting out the automatic starter 209, sequence controller switch FC1 and limit switch 179 and maintaining relay coil 205 energized as long as sequence controller switch C1 remains closed. Switch C1 remains closed for substantially one complete revolution of sequence controller C but momentarily opens just after the loading and unloading apparatus has completed its loading function and just before completion of one revolution sufficiently long to deenergize relay coil 205 to open the holding circuit and recloses as the sequence controller completes its revolution of 360°.

Closure of relay switch R2 also closes contacts R2-3 thereof to establish a circuit directly from P-1, line 215 and line 216 which leads through lines 217 and 218 to the solenoids S-1-C and S-1-O of the control valve V-1 for the chucking device 22. Also in this circuit are lines 216a and 216b which lead to other control devices (not shown) for the heat treating machine.

Closure of relay switch R-2 also closes contacts R2-2 which constitute master control contacts for the unloading and loading mechanism and sequence controller FC.

Thus, relay switch R2 must be energized to condition the various heat treating machine circuits for operation before the loading and unloading apparatus can be operated.

The operation of the unloading and loading mechanism in removing a heat treated pipe P from chucking device 22 and the placement of a new pipe in proper position in chucking device 22 obviously must occur between the start of the heat treating machine cycle (controlled by sequence controller C) and the operation in that cycle of the chucking device 22 in progressing the pipe carried thereby relative to the heat treating head 20, assuming, of course, that chucking device 22 is retracted at the start of that cycle and in clamping relation with respect to the heat treated pipe carried thereby.

The chuck opening switches C3 and FC3 of the two sequence controllers C and FC, respectivey, are so coordinated in operation that the control of the chuck-opening solenoid S-1-O is by either of these switches since they are in parallel. This same condition exists for the chuck closing switches C2 and FC2 for solenoid S-1-C, which are in parallel circuit relation.

It must be kept in mind that relay switch R3 which controls the loading and unloading circuits is directly under the control of the master relay switch R2 which closes at the beginning of the cycle of the sequence controller C and that closure of master relay switch R2 cannot be effected unless sequence controller FC has stopped at the end of its loading cycle to close switch FC1 thereof, and unless the feeding device 40 is in its advanced position 180 to close limit switch 179, this being the position it last had when a pipe was moved therefrom into the heat treating machine chucking device 22.

Assuming this condition at the start of the cycle of sequence controller C, the automatic timer or starter 209 which is so timed with respect to the operation of sequence controller C as to close its contacts immediately after switch C1 recloses at the end of the previous cycle, energizes relay R2 to close contacts R2–1, R2–2 and R2–3 which shunts out switch FC1 and limit switch 179 and also conditions relay R3 and the relay R4 which is the switch for the motor of sequence controller FC, for operation.

At the termination of the previous operation, sequence controller stopped with its switch FC4 in closed circuit position to close a circuit P2, line 219, switch FC4 and line 220 to N2 in which there is an indicating light 221 which indicates to the operator that the pipe P can be unloaded from the chucking device 22. Reference may be had to Figures 13 and to Figure 18, which shows the operation of the various switches and controls during the following description of operation within a complete cycle.

After the automatic starter or timer 209 has energized relay R2 and the indicating light 221 is on, the operator depresses unloading push button 222 which establishes a circuit P2, line 219, switch FC4, line 223 through the closed master switch R2–2, line 224, coil 225 of relay R4 and line 226 to N2, thus energizing coil 225 to start the motor (not shown for sequence controller FC. Simultaneously, closure of this circuit establishes a parallel circuit from line 224, through line 227 coil 228 of relay R3 and line 229 to N2 which closes relay contacts R3–1, R3–2 and R3–3, contacts R3–1 establishing a holding circuit from line 222 through line 230 and line 231 to line 223 to shunt out push button switch 222 and maintain relay coil 228 energized. This holding circuit will be maintained energized as long as sequence controller switch FC4 remains closed, which condition exists until just before the termination of the loading cycle of 180°.

Sequence controller FC then, during its operation in the unloading cycle, first closes switch FC5 thereof to establish a circuit from P2, through line 237, switch R3–3, lines 238 and 239, switch FC5, line 232, solenoid S–3 and line 233 to N2 whereby to energize solenoid S–3 to actuate valve V–3 to cause clamps 51 of the feeding device 40 to clamp about the pipe P. This is immediately followed by the closure of sequence controller switch FC3 which establishes a circuit from line 217 through line 218, solenoid S–1–O, lines 234 and 235, switch FC3 and line 236 to N1, and energizes solenoid S–1–O to actuate valve V–1 to cause clamps 29 of the chucking device 22 to open and disengage the pipe P.

Subsequently, during operation of FC, switch FC6 closes to establish a circuit from line 238 through lines 240 and 241, switch FC6, line 242, solenoid S–4–L and lines 243 and 244 to N2 whereby to energize solenoid S–4–L to actuate valve V–4 and thereby cause fluid motor 47 to retract the feeding device 40 to the position shown at the left in Figure 13, thus withdrawing the pipe P from the chucking device 22.

As the feeding device reaches its retracted position, switch FC6 opens to allow valve V–4 to return to its intermediate position and close ports 171 and 172 and lock the feeding device 40 in its retracted position. Then, switch FC5 opens to deenergize solenoid S–3 whereby spring 167 shifts valve V–3 to open clamps 51 to disengage the pipe P. The pipe P is then removed from the clamps 51.

Approximately as sequence controller FC reaches the termination of 180° of rotation, switch FC4 opens to deenergize the holding circuit of relay switch R3 whereby opening of its shunting contacts R3–1 opens relay switch R4 and stops rotation of sequence switch FC8 however closes as the sequence controller FC terminates its unloading cycle.

At about this time switch FC7 closes to establish a circuit from line 219 through line 245 to solenoid S–2 and line 246 to line 244 to energize solenoid S–2 whereby valve V–2 shifts to cause fluid motor 70 to elevate the cushioning stop device 39 to its cushioning position, as shown in Figure 13. It is to be noted that switch FC7 is not under the control of the relay R–3.

Since the clamps 29 of the chucking device 22 are held in open position the fluid under pressure flows thru conduit 143 and 96 into cylinder 92 to oppose and cushion the piston 90 against movement to the right, as viewed in Figure 13.

Closure of switch FC8 established a circuit through line 219 and line 248 to N2 containing an indicating signal light 249 which indicates to the operator that the apparatus is ready for loading.

First, the new pipe to be heat treated is moved through open clamps 51 and into end engagement with the cushioning stop 97, first engaging plunger 108 to close limit switch 101. Continued cushioning movement then permits limit switch 115 to close and thereby conditioning the starting circuit P2, line 250, switch 101, line 251, switch 115, line 252, starting button 253, line 223, closed master relay contacts R2–2, line 224, relay coil 225 and line 226 for operation. While the pipe is in this position and holding switches 108 and 115 closed the operator depresses loading push button 253 to close this circuit whereupon relay switch R4 is energized and closed to start operation of sequence controller SC and to effect energization of relay coil 228 which closes relay contacts R3–3. Closure of relay contacts R3–3 establishes the circuit from line 219 thru switch FC8 lines 254 and 255 to line 223 to establish a holding circuit which shunts out limit switches 108 and 115 and the loading starter push button switch 253. This holding circuit is maintained established by switch FC8 until the sequence controller FC operates through its 180° loading cycle. During this loading cycle switch FC5 first recloses to cause the clamps 51 to clamp about the pipe, and this is followed immediately by the opening of switch FC7 which deenergizes solenoid S–2 whereby valve V–2 shifts to actuate the cushioning cylinder 92 and stop 97 to the lowered position out of the path of the pipe, and switches 101 and 115 open.

Following this, sequence controller switch FC9 closes to energize solenoid S–4–R through the circuit from line 240, line 256, switch FC9, and lines 257 and 258 to line 246, whereupon solenoid S–4–R actuates valve V–4 to cause fluid motor 47 to advance the feeding device 40 and clamped pipe and position the same within the chuck clamps 29 of chucking device 22 and in proper engagement with the end extension 5. Just as the pipe properly engages the end extension 25, switch FC9 opens and valve V–4 returns to its immediate position to close ports 171 and 172 to lock the feed device 40 in its advanced position. At this time switch 179 closes. Then, sequence controller switch FC2 closes to establish a circuit from line 217 through solenoid S–1–C, lines 259 and 260, switch FC2 and line 261 to N1, whereby solenoid S–1–C is energized to shift valve V–1 to cause fluid motor 35 to clamp the chucking clamps 29 of chucking device 22 about the pipe. After chucking clamps 29 are in proper clamping position switch FC2 opens to return the valve V–1 to its intermediate position to close ports 131 and 132 and lock the clamps 29, and switch FC5 opens to cause motor 57 to release clamps 51 from the pipe. After closing of clamps 29 and the subsequent opening of clamps 51, the sequence controller switch FC8 opens to deenergize the relay coils 225 and 228 of relays R3 and R4, whereupon the sequence controller FC ceases its 180° loading cycle. Switch FC4 and switch FC1 both close substantially as sequence controller FC terminates its loading cycle.

Limit switch 179 is also closed by this time (through the medium of feeding device 40 being in its advanced position). Substantially simultaneous with or slightly after the stopping of sequence controller FC, switch C1 of sequence controller C momentarily opened to deenergize the holding circuit for the master relay R–2 whereby contacts R2–3 thereof open. This is for the purpose of determining whether conditions are proper for operation of the heat treating machine, such as the reciprocation of the chucking device, rotation of the same and the supply of heating energy and quenching medium to the heat treating head 20, all of which are under the control of the master relay R2. The required condition for proper operation is that the pipe be in its predetermined position in the chucking device 22, and this is determined by the feeding device 40 being in its proper advanced position, in which position limit switch 179 is closed. Closure of limit switch 179 is a condition precedent to this operation of the heat treating machine proper.

Now, since limit switch 179 is closed and switch FC1 has reclosed upon stoppage of operation of sequence controller FC at the end of its loading cycle, closure of the starting circuit for relay switch R–2 will be effected by starting operation of the automatic timer 209 whereby to permit closure of relay switch R–2 and the following dependent operation of the heat treating machine. However, if the feeding device 40 is not in its proper position and consequently the pipe is not properly located limit switch will be open and the reclosure of switch C1 at this time will not permit the automatic timer or starter to close the circuit for energizing the master relay R–2 with the result that operation of the heat treating machine will be prevented until such time as the defect is remedied. This same condition will exist if switch FC1 failed to close.

After the heat treating operation is completed and the chucking device 22 has returned to its normal position for loading and unloading, switch C1 opens to deenergize relay R2 and at the completion of the 360° cycle of the sequence controller C, switch C1 closes to condition the control apparatus for the next cycle.

It is obvious that various advantages are to be gained from the apparatus described in that operation of the heat treating machine is dependent upon the existence of certain conditions in the loading and unloading mechanism, in that the control of the loading and unloading mechanism is under the control of the controlling mechanism for the heat treating machine, and in that the handling of heavy and long pipes is greatly facilitated.

It is to be clearly understood that the loading and unloading mechanism is adaptable for use with machine tools and apparatus other than heat treating machines, and also that various changes may be made in the details and arrangements of parts illustrated and described without departing from the spirit and substance of the present invention, the scope of which is defined by the appended claims.

What is claimed is:

1. In an apparatus having an article clamping chuck, mechanism for loading and unloading said chuck, comprising a carriage having an article clamping means and being movable from a retracted position to an advanced position for positioning an article held by the clamping means thereof in said chuck and for removing an article from said chuck, a stop device intermediate said chuck and clamping means and being movable into and out of the path of movement of the article as held by said clamping means, a plurality of motor means, one each for actuating said carriage, clamping means to opened and closed position, and stop device, and a control device for sequentially controlling said motor means to first close said clamping means about an article in engagement with said stop device, then move said stop device out of the path of movement of the article so clamped and thereafter move said carriage to said advanced position to position the article in said chuck.

2. In an apparatus having an article clamping chuck, mechanism for loading and unloading said chuck, comprising a carriage having an article clamping means and being movable from a retracted position to an advanced position for positioning an article held by the clamping means thereof in said chuck and for removing an article from said chuck, a stop device intermediate said chuck and clamping means and being movable into and out of the path of movement of the article as held by said clamping means, a plurality of motor means, one each for actuating said carriage, clamping means to opened and closed position, and stop device, and a control device for sequentially controlling said motor means to first close said clamping means about an article in engagement with said stop device, then move said stop device out of the path of movement of the article so clamped and thereafter move said carriage to said advanced position to position the article in said chuck, said control device including means responsive to the engagement of the article with said stop device for precluding closure of said clamping means in the absence of such engagement.

3. In an apparatus having an article clamping chuck, mechanism for loading and unloading said chuck, comprising a carriage having an article clamping means and being movable from a retracted position to an advanced position for positioning an article held by the clamping means thereof in said chuck and for removing an article from said chuck, a stop device intermediate said chuck and clamping means and being movable into and out of the path of movement of the article as held by said clamping means, a plurality of motor means, one each for actuating said carriage, clamping means to opened and closed position, chuck to opened and closed position and stop device, and a control device for automatically and sequentially controlling said motor means when said carriage is in retracted position to first close said clamping means about an article in engagement with said stop device, then move said stop device out of the path of movement of the article so clamped, then move said carriage to its advanced position to position the article in said chuck, and thereafter first close said chuck about the article and then open said clamping means.

4. In an apparatus having an article clamping chuck, mechanism for loading and unloading said chuck, comprising a carriage having an article clamping means and being movable from a retracted position to an advanced position for positioning an article held by the clamping means thereof in said chuck and for removing an article from said chuck, a stop device intermediate said chuck and clamping means and being movable into and out of the path of movement of the article as held by said clamping means, a plurality of motor means, one each for actuating said carriage, clamping means to opened and closed position, chuck to opened and closed position and stop device, and a control device for automatically and sequentially controlling said motor means when said carriage is in retracted position to first close said clamping means about an article in engagement with said stop device, then move said stop device out of the path of movement of the article so clamped, then move said carriage to its advanced position to position the article in said chuck, and thereafter first close said chuck about the article and then open said clamping means, said control device including means responsive to said carriage being in its advanced position to preclude closure of said chuck in the absence of said carriage being in its advanced position.

5. In an apparatus having an article clamping chuck, mechanism for loading and unloading said chuck, comprising a carriage having an article clamping means and being movable from a retracted position to an advanced position for positioning an article held by the clamping means thereof in said chuck and for removing an article from said chuck, a stop device intermediate said chuck and clamping means and being movable into and out of the path of movement of the article as held by said clamping means, a plurality of motor means, one each for actuating said carriage, clamping means to opened and closed position, chuck to opened and closed position and stop device, and a control device for automatically and sequentially controlling said motor means when said carriage is in retracted position to first close said clamping means about an article in engagement with said stop device, then move said stop device out of the path of movement of the article so clamped, then move said carriage to its advanced position to position the article in said chuck, and thereafter first close said chuck about the article and then open said clamping means, said control device including means responsive to engagement of the article with said stop device to preclude closure of said clamping means in the absence of such engagement.

6. In an apparatus having an article-clamping chuck provided with an article engaging element, chuck loading and unloading mechanism, comprising stop means for locating the article a predetermined distance from said element, a carriage movable from a retracted position toward said chuck a distance corresponding to said predetermined distance, article clamping means on said carriage for securely clamping the article for loading into said chuck, control means for sequentially actuating said clamping means into clamping relation with the article and for moving said carriage said predetermined distance to position the article in said chuck in engagement with said element, and means responsive to engagement between the article and said stop means for preventing said control means for actuating said clamping means into said clamping relation in the absence of such engagement.

7. In an apparatus having an article-clamping chuck provided with an article engaging element, chuck loading and unloading mechanism, comprising stop means for locating the article a predetermined distance from said element, a carriage movable from a retracted position toward said chuck a distance corresponding to said predetermined distance, article clamping means on said carriage for securely clamping the article for loading into said chuck, said stop means being movable from its article engaging position out of the path of movement of the article as held by said clamping means, and control means for sequentially actuating said clamping means into clamping relation with the article, for moving said stop means out of the path of article movement and then for moving said carriage said predetermined distance to position the article in said chuck in engagement with said article-engaging element.

8. In an apparatus having an article-clamping chuck provided with an article engaging element, chuck loading and unloading mechanism, comprising stop means for locating the article a predetermined distance from said element, a carriage movable from a retracted position toward said chuck a distance corresponding to said predetermined distance, article clamping means on said carriage for securely clamping the article for loading into said chuck, said stop means being movable from its article engaging position out of the path of movement of the article as held by said clamping means, control means for sequentially actuating said clamping means into clamping relation with the article, for moving said stop means out of the path of article movement and then for moving said carriage said predetermined distance to position the article in said chuck in engagement with said article-engaging element, and means responsive to engagement between the article and said stop means for preventing said control means from actuating said clamping means into said clamping relation in the absence of such engagement.

9. In an apparatus having an article-clamping chuck provided with an article engaging element, chuck loading and unloading mechanism, comprising stop means for locating the article a predetermined distance from said element, a carriage movable from a retracted position toward said chuck a distance corresponding to said predetermined distance, article clamping means on said carriage for securely clamping the article for loading into said chuck, control means for sequentially actuating said clamping means into clamping relation with the article and for moving said carriage said predetermined distance to position the article in said chuck in engagement with said element, and means responsive to engagement between the article and said stop means for preventing said control means from actuating said clamping means into said clamping relation in the absence of such engagement, said control means being effective after the positioning of the article in said chuck to actuate said chuck into article-clamping relation before releasing said clamping means from article-clamping relation, whereby the article is properly positioned in said chuck.

10. In an apparatus having an article clamping chuck, a reciprocable carriage having an article clamping means and being movable in one direction to advance an article clamped therein from a predetermined position into said chuck and movable in the opposite direction to clamp and withdraw the article from said chuck, motive means for actuating each of said chuck, clamping means and carriage and electrically operatable control devices for said motive means, a control system for controlling the operation of said control devices, comprising a source of electric current; a secondary control circuit for said control devices including said source and a switch for making and breaking the same; and a master control circuit including said source, a circuit-making means, a circuit-breaking means for breaking the same after a predetermined time interval independently of said circuit-making means, a device energizable by said master control circuit for closing said switch and a switching means responsive to a predetermined position of said carriage for preventing energization of said master control circuit by circuit-closing action of said circuit-making means in the absence of said carriage being at said last named predetermined position.

11. In an apparatus having an article clamping chuck, a reciprocable carriage having an article clamping means and being movable in one direction to advance an article clamped therein from a predetermined position into said chuck and movable in the opposite direction to clamp and withdraw the article from said chuck, motive means for actuating each of said chuck, clamping means and carriage and electrically operatable control devices for said motive means, a control system for controlling the operation of said control devices, comprising a source of electric current; a secondary control circuit for said control devices including said source and a switch for making and breaking the same; and a master control circuit including said source, a circuit-making means, a circuit-breaking means for breaking the same after a predetermined time interval independently of said circuit-making means, a device energizable by said master control circuit for closing said switch, and a pair of contacts closable by movement of said carriage to a predetermined position whereby energization of said master control circuit is dependent upon said carriage being in said last-named predetermined position.

12. In an apparatus having an article clamping chuck, a reciprocable carriage having an article clamping means and being movable in one direction to advance an article clamped therein from a predetermined position into said chuck and movable in the opposite direction to clamp and withdraw the article from said chuck, motive means for actuating each of said chuck, clamping means and carriage and electrically operatable control devices for said motive means, a control system for controlling the operation of said control devices, comprising a source of electric current; a secondary control circuit for said control devices including said source and a switch for making and breaking the same; and a master control circuit including said source, a circuit-making means, a circuit-breaking means for breaking the same after a predetermined time interval independently of said circuit-making means, a device energizable by said master control circuit for closing said switch, and a pair of contacts closable by movement of said carriage to a predetermined position whereby energization of said master control circuit is dependent upon said carriage being in said last-named predetermined position, said master control circuit also including a holding circuit energizable upon closure of said switch for shunting out said contacts to maintain said master control circuit energized during said predetermined time interval.

13. In an apparatus having an article clamping chuck, a reciprocable carriage having an article clamping means and being movable in one direction to advance an article clamped therein from a predetermined position into said chuck and movable in the opposite direction to clamp and withdraw the article from said chuck, motive means for actuating each of said chuck, clamping means and carriage and electrically operatable control devices for said motive means, a control system for controlling the operation of said control devices, comprising a source of electric current; a secondary control circuit for said control devices including said source and a switch for making and breaking the same; a master control circuit including said source, a circuit-making means, a circuit-breaking means for breaking the same after a predetermined time interval independently of said circuit-making means, and a device energizable by said master control circuit for closing said switch; said secondary control circuit including a starting switch and a time switch; and a means for maintaining said time switch closed for a predetermined period only within said predetermined time interval, said last-named means being arranged after energization of said control circuit upon closure of said starting switch, to open said time switch and thereby deenergize said secondary control switch at the termination of said predetermined period.

14. In an apparatus having an article clamping chuck, a reciprocable carriage having an article clamping means and being movable in one direction to advance an article clamped therein from a predetermined position into said chuck and movable in the opposite direction to clamp and withdraw the article from said chuck, motive means for actuating each of said chuck, clamping means and carriage and electrically operatable control devices for said motive means, a control system for controlling the operation of said control devices, comprising a source of electric current; a secondary control circuit for said control devices including said source and a switch for making and breaking the same; a master control circuit including said source, a circuit-making means, a circuit-breaking means for breaking the same after a predetermined time interval independently of said circuit-making means, and a device energizable by said master control circuit for closing said switch, said secondary control circuit including parallel circuits, each having therein a starting switch and a time switch; and means for maintaining said time switches closed for separate predetermined periods within said predetermined time interval and for opening each of said time switches after its predetermined period to deenergize said secondary control circuit.

15. In an apparatus having an article clamping chuck, a reciprocable carriage having an article clamping means and being movable in one direction to advance an article clamped therein from a predetermined position into said chuck and movable in the opposite direction to clamp and withdraw the article from said chuck, motive means for actuating each of said chuck, clamping means and carriage and electrically operatable control devices for said motive means, a control system for controlling the operation of said control devices, comprising a source of electric current; a secondary control circuit for said control devices including said source and a switch for making and breaking the same; a master control circuit including said source, a circuit-making means, a circuit-breaking means for breaking the same after a predetermined time interval independently of said circuit-making means, a device energizable by said master control circuit for closing said switch, and a time switch; and means for closing said time switch at the initiation of said predetermined time interval whereby energization of said master control circuit is dependent upon said time switch being closed at the initiation of said interval.

16. In an apparatus having an article clamping chuck, a reciprocable carriage having an article clamping means and being movable in one direction to advance an article clamped therein from a predetermined position into said chuck and movable in the opposite direction to clamp and withdraw the article from said chuck, motive means for actuating each of said chuck, clamping means and carriage and electrically operatable control devices for said motive means, a control system for controlling the operation of said control devices, comprising a source of electric current; a secondary control circuit for said control devices including said source and a switch for making and breaking the same; a master control circuit including said source, a circuit-making means, a circuit-breaking means for breaking the same after a predetermined time interval independently of said circuit-making means, a device energizable by said master control circuit for closing said switch, and a time switch; and means for closing said time switch at the initiation of said predetermined time interval whereby energization of said master control circuit is dependent upon said time switch being closed at the initiation of said interval, said master control circuit also including a holding circuit energizable upon closure of said switch for shunting out said time switch and said circuit making means to maintain said master control circuit energized during said predetermined time interval.

17. A work handling mechanism having in combination, a chuck for holding a workpiece during work thereon, a carriage provided with work gripping means movable toward and from said chuck to grip and move a workpiece into position within said chuck and to regrip and remove a workpiece from said chuck, and means for operating said work gripping means to release a workpiece after engagement thereof by said chuck prior to work thereon, and to regrip said workpiece prior to release thereof by said chuck after completion of work thereon.

18. In an apparatus having an article-clamping chuck for chucking long, heavy articles and provided with an article-engaging element, chuck-loading and unloading mechanism comprising stop means for locating the article a predetermined distance from said element, article-clamping means for securely holding the article in the position predetermined by said stop means and in axial alignment with said chuck, said stop means being movable from its operative position to a position clear of the article, means for effecting relative movement of said chucking and clamping means longitudinally of the axis of the article toward each other for said predetermined distance only, and control means for sequentially actuating said clamping means into clamping relation with the article, for moving said stop means to a position clear of the article and for effecting said relative movement of said chuck and clamping means whereby to cause the article to engage said element.

19. A work handling mechanism having in combination a chuck for holding a workpiece during work thereon, a work gauge movable into and out of operative position, means for gripping a workpiece and moving it into predetermined chuck loading position as determined by said gauge, and for then advancing said workpiece a predetermined distance into said chuck to be engaged thereby and released by said gripping means, and means for actuating said gripping means to regrip said workpiece after subsequent release by said chuck and remove said workpiece from said chuck.

20. Work handling mechanism for long, heavy cylindrical workpieces comprising a work support having a clamping chuck for chucking the workpiece during the performance of work thereon, chuck-loading and unloading mechanism spaced from said work support and having workpiece-gripping means in axial alignment with said clamping chuck, said chuck and gripping means being relatively movable a predetermined distance toward each other to chuck-loading position and away from each other to unload said chuck, means for effecting said relative movement, means for actuating said clamping chuck, and means for actuating said gripping means in the chuck-loading position of said mechanism to release the workpiece after clamping engagement therewith by said chuck prior to the performance of work thereon, and to regrip the workpiece prior to release thereof by said chuck after the performance of work thereon.

HOWARD E. SOMES.